(12) United States Patent
Wang et al.

(10) Patent No.: US 6,486,599 B2
(45) Date of Patent: Nov. 26, 2002

(54) FIELD EMISSION DISPLAY PANEL EQUIPPED WITH TWO CATHODES AND AN ANODE

(75) Inventors: Wen-Chun Wang, Taichung (TW); Cheng-Chung Lee, Hsinchu (TW); Feng-Yu Chuang, Hsinchu (TW); Jen-Hui Liao, Hsinchu (TW); Chi-Yun Hsu, Hsinchu (TW); Chung-Shan Han, Hsinchu (TW)

(73) Assignee: Industrial Technology Research Institute, Hsin Chu (TW)

( * ) Notice: Subject to any disclaimer, the term of this patent is extended or adjusted under 35 U.S.C. 154(b) by 70 days.

(21) Appl. No.: 09/812,746

(22) Filed: Mar. 20, 2001

(65) Prior Publication Data

US 2002/0135295 A1 Sep. 26, 2002

(51) Int. Cl.$^7$ .................................................. H01J 1/62
(52) U.S. Cl. ........................ 313/495; 313/310; 313/336; 313/351; 445/24
(58) Field of Search ................................ 313/495–497, 313/309, 310, 311, 326, 336, 351; 445/24, 51

(56) References Cited

U.S. PATENT DOCUMENTS 6,097,138 A * 8/2000 Nakamoto .................. 313/309
6,146,230 A * 11/2000 Kim et al. .................. 252/500
6,339,281 B2 * 1/2002 Lee et al. .................... 313/309
6,359,383 B1 * 3/2002 Chuang et al. ............. 313/309
6,414,444 B2 * 7/2002 Fox et al. .................... 313/495

* cited by examiner

*Primary Examiner*—David Martin
*Assistant Examiner*—Thanh S. Phan
(74) *Attorney, Agent, or Firm*—Tung & Associates

(57) ABSTRACT

A field emission display panel that utilizes nanotube emitters as electron sources and is equipped with two cathodes i.e. a primary cathode and an auxiliary cathode, and an anode is provided. The nanotube emitters can be suitably formed by nanometer-dimensioned hollow tubes of carbon, diamond or diamond-like carbon mixed in a polymeric-based binder. The nanotube emitters are formed in two parallelly-positioned, spaced-apart rows on top of an electrode layer such as a silver paste by a thick film printing technique. Since both the primary cathode and the anode are formed on the bottom glass plate, the operating voltage can be controlled by the thickness of the dielectric layer that is used in forming the nanotube emitter stacks. An auxiliary cathode formed of an electrically conductive material is coated on the interior surface of a top glass plate to further repel electrons in a downward direction toward the anode on the bottom glass plate. As a result, the distance between the top plate and the bottom plate can be chosen to allow the rapid evacuation of the panel cavity to form a high vacuum therein without affecting the operating voltage of the device. The present invention novel FED panel can be fabricated with a large panel area and at a low cost.

24 Claims, 3 Drawing Sheets

FIELD EMISSION DISPLAY PANEL EQUIPPED WITH TWO CATHODES AND AN ANODE

FIELD OF THE INVENTION

The present invention generally relates to a field emission display (FED) device and a method for fabricating the device and more particularly, relates to a field emission display device equipped with two cathodes, an anode and nanotube emitters as the electron emission source, and a method for fabricating the device by a thick film printing technique.

BACKGROUND OF THE INVENTION

In recent years, flat panel display devices have been developed and widely used in electronic applications such as personal computers. One of the popularly used flat panel display device is an active matrix liquid crystal display which provides improved resolution. However, the liquid crystal display device has many inherent limitations that render it unsuitable for a number of applications. For instance, liquid crystal displays have numerous fabrication limitations including a slow deposition process for coating a glass panel with amorphous silicon, high manufacturing complexity and low yield for the fabrication process. Moreover, the liquid crystal display devices require a fluorescent back light which draws high power while most of the light generated is wasted. A liquid crystal display image is also difficult to see under bright light conditions or at wide viewing angles which further limit its use in many applications.

Other flat panel display devices have been developed in recent years to replace the liquid crystal display panels. One of such devices is a field emission display device that overcomes some of the limitations of LCD and provides significant advantages over the traditional LCD devices. For instance, the field emission display devices have higher contrast ratio, larger viewing angle, higher maximum brightness, lower power consumption and a wider operating temperature range when compared to a conventional thin film transistor (TFT) liquid crystal display panel.

A most drastic difference between a FED and a LCD is that, unlike the LCD, FED produces its own light source utilizing colored phosphors. The FEDs do not require complicated, power-consuming backlights and filters and as a result, almost all the light generated by a FED is visible to the user. Furthermore, the FEDs do not require large arrays of thin film transistors, and thus, a major source of high cost and yield problems for active matrix LCDs is eliminated.

In a FED, electrons are emitted from a cathode and impinge on phosphors coated on the back of a transparent cover plate to produce an image. Such a cathodoluminescent process is known as one of the most efficient methods for generating light. Contrary to a conventional CRT device, each pixel or emission unit in a FED has its own electron source, i.e., typically an array of emitting microtips. A voltage difference existed between a cathode and a gate electrode which extracts electrons from the cathode and accelerates them toward the phosphor coating. The emission current, and thus the display brightness, is strongly dependent on the work function of the emitting material. To achieve the necessary efficiency of a FED, the cleanliness and uniformity of the emitter source material are very important.

In order for the electron to travel in a FED, most FEDs are evacuated to a low pressure such as $10^{-7}$ torr in order to provide a log mean free path for the emitted electrons and to prevent contamination and deterioration of the microtips. The resolution of the display can be improved by using a focus. grid to collimate electrons drawn from the microtips.

In the early development for field emission cathodes, a metal microtip emitter of molybdenum was utilized. In such a device, a silicon wafer is first oxidized to produce a thick silicon oxide layer and then a metallic gate layer is deposited on top of the oxide. The metallic gate layer is then patterned to form gate openings, while subsequent etching of the silicon oxide underneath the openings undercuts the gate and creates a well. A sacrificial material layer such as nickel is deposited to prevent deposition of nickel into the emitter well. Molybdenum is then deposited at normal incidence such that a cone with a sharp point grows inside the cavity until the opening closes thereabove. An emitter cone is left when the sacrificial layer of nickel is removed.

In an alternate design, silicon microtip emitters are produced by first conducting a thermal oxidation on silicon and then followed by patterning the oxide and selectively etching to form silicon tips. Further oxidation or etching protects the silicon and sharpens the point to provide a sacrificial layer. In another alternate design, the microtips are built onto a substrate of a desirable material such as glass, as an ideal substrate for large area flat panel displays. The microtips can be formed of conducting materials such as metals or doped semi-conducting materials. In this alternate design for a FED device, an interlayer that has controlled conductivity deposited between the cathode and the microtips is highly desirable. A proper resistivity of the interlayer enables the device to operate in a stable condition. In fabricating such FED devices, it is therefore desirable to deposit an amorphous silicon film which has electrical conductivity in an intermediate range between that of intrinsic amorphous silicon and n⁺ doped amorphous silicon. The conductivity of the n⁻ doped amorphous silicon can be controlled by adjusting the amount of phosphorous atoms contained in the film.

Generally, in the fabrication of a FED device, the device is contained in a cavity of very low pressure such that the emission of electrons is not impeded. For instance, a low pressure of $10^{-7}$ torr is normally required. In order to prevent the collapse of two relatively large glass panels which form the FED device, spacers must be used to support and provide proper spacing between the two panels. For instance, in conventional FED devices, glass spheres or glass crosses have been used for maintaining such spacings in FED devices. Elongated spacers have also been used for such purpose.

Referring initially to FIG. 1A wherein an enlarged, cross-sectional view of a conventional field emission display device 10 is shown. The FED device 10 is formed by depositing a resistive layer 12 of typically an amorphous silicon base film on a glass substrate 14. An insulating layer 16 of a dielectric material and a metallic gate layer 18 are then deposited and formed together to provide metallic microtips 20 and a cathode structure 22 is covered by the resistive layer 12 and thus, a resistive but somewhat conductive amorphous silicon layer 12 underlies a highly insulating layer 16 which is formed of a dielectric material such as $SiO_2$. It is important to be able to control the resistivity of the amorphous silicon layer 12 such that it is not overly resistive but yet, it will act as a limiting resistor to prevent excessive current flow if one of the microtips 20 shorts to the metal layer 18.

A completed FED structure 30 including anode 28 mounted on top of the structure 30 is shown in FIG. 1B. It is to be noted, for simplicity reasons, the cathode layer 22 and the resistive layer 12 are shown as a single layer 22 for the cathode. The microtips 20 are formed to emit electrons 26 from the tips of the microtips 20. The gate electrodes 18 are provided with a positive charge, while the anode 28 is provided with a higher positive charge. The anode 28 is formed by a glass plate 36 which is coated with phosphorous particles 32. An intermittent conductive layer of indium-tin-oxide (ITO) layer 34 may also be utilized to further improve the brightness of the phosphorous layer when bombarded by electrons 26. This is shown in a partial, enlarged cross-sectional view of FIG. 1C. The total thickness of the FED device is only about 2 mm, with vacuum pulled in between the lower glass plate 14 and the upper glass plate 36 sealed by sidewall panels 38 (shown in FIG. 1B).

The conventional FED devices formed by microtips shown in FIGS. 1A–1C produce a flat panel display device of improved quality when compared to liquid crystal display devices. However, a major disadvantage of the microtip FED device is the complicated processing steps that must be used to fabricate the device. For instance, the formation of the various layers in the device, and specifically, the formation of the microtips requires a thin film deposition technique utilizing a photolithographic method. As a result, numerous photomasking steps must be performed in order to define and fabricate the various structural features in the FED. The CVD deposition processes and the photolithographic processes involved greatly increase the manufacturing cost of a FED device.

In a co-pending application, Ser. No. 09/377,315, assigned to the common assignee of the present invention, a field emission display device and a method for fabricating such device of a triode structure using nanotube emitters as the electron emission sources were disclosed. In the triode structure FED device, the device is constructed by a first electrically insulating plate, a cathode formed on the first electrically insulating plate by a material that includes metal, a layer formed on the cathode of a high electrical resistivity material, a layer of nanotube emitters formed on the resistivity layer of a material of carbon, diamond or diamond-like carbon wherein the cathode, the resistivity layer and the nanotube emitter layer form an emitter stack insulated by an insulating rib section from adjacent emitter stacks, a dielectric material layer perpendicularly overlying a multiplicity of the emitter stacks, a gate electrode on top of the dielectric material layer, and an anode formed on a second electrically insulating plate overlying the gate electrode. The FED device proposed can be fabricated advantageously by a thick film printing technique at substantially lower fabrication cost and higher fabrication efficiency than the FEDs utilizing microtips. However, three separate electrodes are still required for the device, i.e., a cathode, a gate electrode and an anode which must be formed in separate process steps.

In another co-pending application, Ser. No. 09/396,536, assigned to the common assignee of the present invention, a field emission display device and a method for fabricating the diode structure device using nanotube emitters as the electron emission sources were disclosed. In the diode structure FED device, the device is constructed by a first glass plate that has a plurality of emitter stacks formed on a top surface, each of the emitter stacks is formed parallel to a transverse direction of the glass plate and includes a layer of electrically conductive material such as silver paste and a layer of nanotube emitter on top. The first glass plate has a plurality of rib sections formed of an insulating material in between the plurality of emitter stacks to provide electrical insulation. A second glass plate is positioned over and spaced-apart from the first glass plate with an inside surface coated with a layer of an electrically conductive material such as indium-tin-oxide. A multiplicity of fluorescent powder coating strips is then formed on the ITO layer each for emitting a red, green or blue light when activated by electrons emitted from the plurality of emitter stacks. The field emission display panel is assembled together by a number of side panels that joins the peripheries of the first and second glass plate together to form a vacuum-tight cavity therein. The FED device disclosed in this application can be fabricated with only two electrodes, i.e., the first electrode coated on the bottom glass plate and the second electrode coated on the top glass plate without the use of a gate electrode in between the two plates. In this configuration, the electron emitted from the nanotube emitters do not strike the phosphor coating layer on the top glass plate as hard as they would have when a gate electrode is utilized.

Various other fabrication and performance problems have been encountered in the above-described triode and diode structured FED'S. For instance, in the triode structure FED's, the fabrication process is more complex and thus more difficult to achieve products of high reliability. The thickness of the insulating dielectric layer and the spacing between the electrodes must be formed with high precision in order to achieve reliability. In the diode structure FED's, the distance between the cathode of phosphor coating and the anode of nanotube emitters must not be larger than 100 $\mu$m. This limitation must be met in order to produce an operating field at 5 volts/$\mu$m in a nanotube emitter type FED so that the driving voltage required stays in a reasonable range, i.e. smaller than 500 volts. The small distance allowed between the top plate (the anode) and the bottom plate (the cathode) causes other processing difficulties such as that of achieving a high vacuum in the cavity between the two plates, particularly when display panels of large dimensions are fabricated; and that of scattered electrons when only two electrodes are used resulting in reduced intensity and image quality.

It is therefore an object of the present invention to provide a FED panel that can be fabricated by a thick film printing technique which does not have the drawbacks or shortcomings of the conventional FED panel fabricated by thin film deposition processes.

It is another object of the present invention to provide a FED panel that can be fabricated by a thick film printing technique to form two cathodes and an anode in-between two panel substrates.

It is a further object of the present invention to provide a diode structure FED panel that can be fabricated by a thick film printing technique in forming a primary cathode, an auxiliary cathode and an anode for improved light intensity.

It is another further object of the present invention to provide a FED panel that can be fabricated by a screen printing technique and assembled without critical alignment requirements.

It is still another object of the present invention to provide a FED panel which utilizes two cathodes formed by a thick film printing technique and an anode of an ITO (indium-tin-oxide) electrode film formed by a thin film sputtering technique.

It is yet another object of the present invention to provide a FED panel wherein a dielectric layer of large thickness is used to insulate a primary cathode from an anode wherein the primary cathode is formed in two parallelly-positioned rows of electrodes formed of carbon nanotubes on each emitter stack.

It is still another further object of the present invention to provide a method for fabricating a FED panel by first using a thick film technique for forming a plurality of electron emitters in a nanotube material and then a thin film sputtering technique for forming an anode of ITO.

It is yet another further object of the present invention to provide a method for fabricating a FED panel by using a thick film printing technique for forming a plurality of nanotube emitters on top of a cathode layer by mixing nanometer dimensioned hollow fibers of carbon, diamond or diamond-like carbon in a polymeric-based binder.

SUMMARY OF THE INVENTION

In accordance with the present invention, a field emission display panel equipped with two cathodes, i.e. a primary cathode and an auxiliary cathode, and an anode and a method for fabricating the FED panel by a thick film printing technique are disclosed.

In a preferred embodiment, a field emission display panel that has two cathodes and an anode is provide which includes a first electrically insulating plate for use as a first panel substrate; a first plurality of emitter stacks formed substantially equally spaced from each other at a predetermined spacing in a longitudinal direction on the first electrically insulating plate, each of the emitter stacks is positioned parallel to a transverse direction of the first insulating plate and includes sequentially a layer of a dielectric material, a layer of a first electrically conductive material and a layer of nanotube emitters with the layer of dielectric material intimately contacting the first electrically insulating plate, the layer of nanotube emitters is formed in two rows spaced-apart and insulated from each other, a second plurality of nanotube emitters is formed spaced-apart and insulated from each other in each row; a second plurality of electrically conductive strips formed of a substantially transparent material coated on the first electrically insulating plate in-between the plurality of emitter stacks insulated from each other by the layer of dielectric material; a second plurality of fluorescent coating strips formed on the second plurality of electrically conductive strips each for emitting a red, green or blue light upon activation by electrons emitted from the second plurality of nanotube emitters on the first plurality of emitter stacks; a second electrically insulating plate positioned over and spaced-apart from the first electrically insulating plate for use as a second panel substrate, the second plate has on a surface facing the first plate a layer of the substantially transparent material coated; and a plurality of side panels joining peripheries of the first and second electrically insulating plates together forming a vacuum-tight cavity therein.

In the field emission display panel that is equipped with two cathodes and an anode, the second plurality of electrically conductive strips may further include a reflective coating layer coated in-between the second plurality of electrically conductive strips and the first electrically insulating plate. The reflective coating layer may be formed of a metal. The first and second electrically insulating plates may be formed of a ceramic material that is substantially transparent. The layer of the first electrically conductive material is a first cathode and the substantially transparent material coated on the second plate is a second cathode for the field emission display panel. The layer of the first electrically conductive material may be a silver paste. The second plurality of electrically conductive strips are an anode for the field emission display panel. The second plurality of electrically conductive strips may be formed of indium-tin-oxide. The layer of nanotube emitters may be formed of a mixture of nanometer dimensioned hollow tubes and a binder material. The layer of nanotube emitters may be formed of a mixture of nanometer dimensioned hollow tubes of carbon, diamond, or diamond-like carbon and a polymeric-based binder. Each of the second plurality of flourescent coating strips emits a light of red, green or blue that is different than the light emitted by its immediate adjacent strips when activated by electrons emitted from an adjacent pair of the second plurality of nanotube emitters. The layer of dielectric material in the first plurality of emitter stacks has a thickness between about 10 $\mu$m and about 300 $\mu$m.

The present invention is further directed to a method for fabricating a field emission display panel with two cathodes and an anode including the operating steps of first providing a first electrically insulating plate; forming a first plurality of electrically conductive strips of a substantially transparent material on the first electrically insulating plate, the first plurality of electrically conductive strips is an anode; forming a first plurality of emitter stacks on the first electrically insulating plate by a thick film printing technique parallel to a transverse direction of the first electrically insulating plate, each of the emitter stacks includes sequentially a layer of a dielectric material, a layer of a second electrically conductive material and a layer of nanotube emitters with the layer of dielectric material intimately contacting the first electrically insulating plate; forming a second plurality of nanotube emitters spaced-apart and insulated from each other in two parallelly situated and spaced-apart rows on top of each emitter stack from the layer of nanotube emitters, the second plurality of nanotube emitters is a first cathode; forming a second plurality of fluorescent coating strips on the first plurality of electrically conductive strips each for emitting a red, green or blue light when activated by electrons emitted from the second plurality of nanotube emitters on the first plurality of emitter stacks, positioning a second electrically insulating plate over and spaced-apart from the first electrically insulating plate, the second plate has on a surface facing the first plate a layer of the substantially transparent material coated forming a second cathode; and joining the first and second electrically insulating plates together by side panels and forming a vacuum-tight cavity therein.

The method for fabricating a field emission display panel with two cathodes and an anode may further include the step of providing the first and second electrically insulating plates in substantially transparent glass plates. The method may further include the step of printing the layer of a second electrically conductive material in a silver paste. The method may further include the step of printing the layer of nanotube emitters from a mixture of a binder and nanometer dimensioned hollow fibers selected from the group consisting of carbon fibers, diamond fibers and diamond-like carbon fibers. The method may further include the step of connecting a negative charge to each of the first and second cathodes and a positive charge to the anode. The first plurality of electrically conductive strips may be formed of indium-tin-oxide.

The method for fabricating a field emission display panel with two cathodes and an anode may further include the step of coating a reflective coating layer in-between the first plurality of electrically conductive strips and the first electrically insulating plate. The second multiplicity of fluorescent coating strips may be formed by a thick film printing technique. The second multiplicity of fluorescent coating strips may be formed such that each strip emits a red, green or blue light that is different than its immediate adjacent strips when activated by electrons emitted from an adjacent pair of the second plurality of nanotube emitters. The method may further include the step of coating the reflective coating layer in a metallic material, or in Cr or Al. The method may further include the step of forming the second plurality of fluorescent coating strips by a material that includes phosphor.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

Figure 1A:
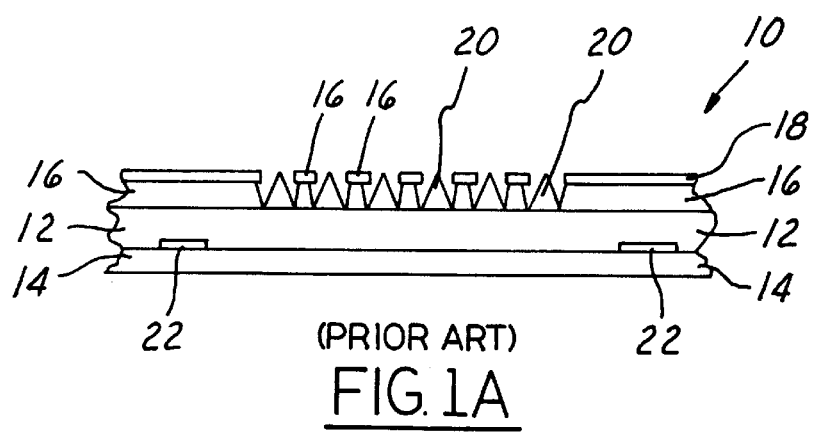
FIG. 1A is an enlarged, cross-sectional view of a conventional field emission display device utilizing microtips for electron emissions
Figure 1B:
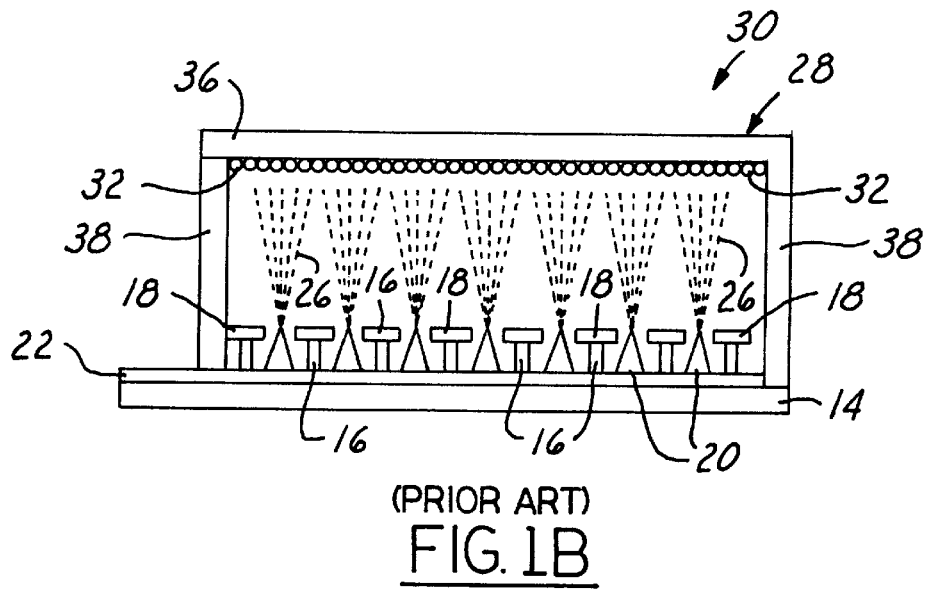
FIG. 1B is an enlarged, cross-sectional view of the conventional field emission display device of FIG. 1A further includes an anode and sidewall panels forming a sealed chamber.
Figure 1C:
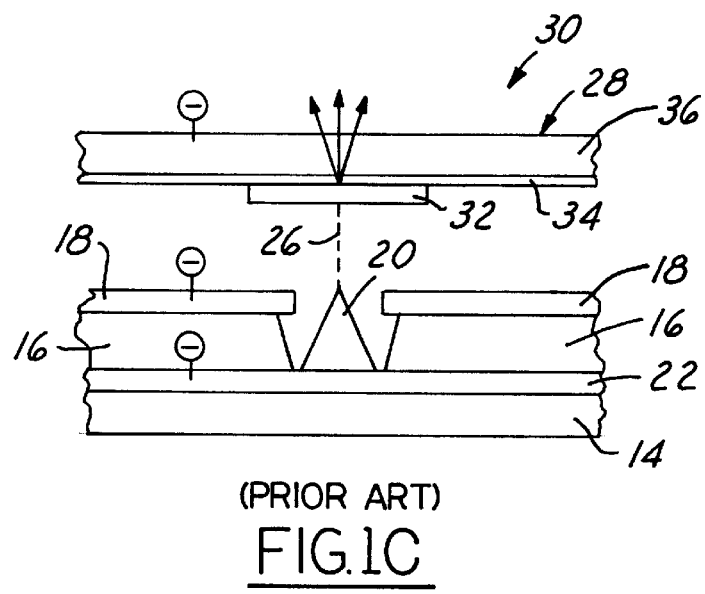
FIG. 1C is an enlarged, partial cross-sectional view of the conventional field emission display device of FIG. 1B illustrating the structure of a single microtip.

The present invention discloses a field emission display panel that is equipped with two cathodes, an anode and electron emitters formed by a nanotube material. The electron emitters formed by the nanotube materials can be suitably deposited by a low cost thick film printing technique that includes screen printing and ink-jet printing.

In the present invention FED panel, two cathodes and an anode are utilized in the triode structure. The arrangement of the primary cathode and the anode on the same substrate enables numerous benefits. For instance, since the primary cathode and the anode are formed on the same substrate, the normal design consideration for a FED panel that the distance between the top panel and the bottom panel must be minimized in order to maintain a minimum driving voltage does not apply. As a result, larger spacers may be used in-between the top panel and the bottom panel so that a high vacuum may be easily achieved in-between the panels. Secondly, since the primary cathode and the anode are formed on the same substrate, i.e. on the same bottom substrate, the alignment procedure and thus the assembly of the top panel to the bottom panel becomes substantially simpler. As a result, the alignment procedure is no longer a critical step in the assembly of the FED panel. Thirdly, the present invention novel FED structure can be viewed from either the side of the top panel or from the side of the bottom panel. When viewed from the top panel, a reflective coating may be needed on the bottom of the ITO electrode layer. This provides a great benefit when compared to a conventional FED panel which can only be viewed from the top side.

In addition to the primary cathode, the present invention FED panel further provides an auxiliary cathode that is formed on the inside surface (or the surface facing the bottom panel substrate) of the top panel substrate. When a negative charge is applied to the auxiliary cathode, the negative charge repels any scattered electrons that may have projected in an upward direction from the nanotube emitters, instead of the downward direction as they are supposed to.

In the present invention FED panel, the primary cathode may be advantageously formed of a silver paste or of any other conductive paste material or film. The auxiliary cathode and the anode may be advantageously formed of a transparent, conductive material such as indium-tin-oxide on the top and the bottom panel substrate (or insulating plate), respectively. The ITO material is substantially transparent and therefore does not affect the function of the display panel when it is applied to an optically transparent glass plate. The present invention FED panel can be fabricated by a low cost fabrication method, i.e. such as by thick film printing the silver paste layer and the nanotube emitter layer for forming the primary cathode, and by thick film printing the fluorescent coating strips for forming the anode.

Contrary to the conventional thin film FED panels which utilize Spindt-type electron emission source that requires high driving voltages, the present invention novel thick film printed FED panels require substantially lower driving voltages for operation. Furthermore, the present invention FED panels can be fabricated by a thick film printing technique and thus is especially suitable for making flat display panels of large size. The performance of the present invention FED panels compares favorably to conventional VFD (vacuum fluorescent display) panels which require hot electron sources, and therefore is difficult for applications that require dynamic video drive. Only a cold electron source is necessary in the present invention novel FED's. The thick film printing technique utilized for depositing the nanotube emitters can be a screen printing technique or an ink-jet printing technique.

The operating electric field required for the present invention nanotube emitters should be less than 5 volts/$\mu$m. For instance, when the total thickness of the dielectric material layer is about 100 $\mu$m, a suitable operating voltage is 500 volts for the FED panel. It was also found that the efficiency of catching the electrons by the anode can be controlled by suitably adjusting the thickness of the dielectric material layer, i.e. anywhere between 10 $\mu$m and 300 $\mu$m, and preferably between 10 $\mu$m and about 30 $\mu$m. The low end of the range is limited by the thick film printing technology, while the high end of the thickness range is limited by the driving voltage requirement.

The present invention FED panel can be formed by first providing a transparent glass plate as the bottom insulating plate, or the first panel substrate. By a thin film sputtering technique, a substantially transparent electrode layer of an electrically conductive material such as indium-tin-oxide (ITO) is coated on the bottom insulating plate. The ITO layer is used as the anode. A thick dielectric material layer is then formed by a thick film printing technique on top of the ITO and bottom insulating plate. A suitable thick film printing technique for depositing the dielectric layer can be a screen printing technique. On top of the dielectric material layer, is then deposited an electrode layer of a conductive paste material such as a silver paste and then a plurality of nanotube emitters is formed on top of the electrode layer in two parallelly positioned, spaced-apart rows by another thick film printing technique using nanometer dimensioned hollow tubes or fibers of carbon, diamond or diamond-like carbon. The dielectric layer formed in the emitter stacks are used for insulating the anode and cathode. On top of the anode layer of ITO, is then deposited a plurality of fluorescent coating strips which is normally a phosphor-based powder for emitting the three basic colors of red, green and blue.

By utilizing the present invention novel FED panel wherein a primary cathode and an anode are formed on the bottom panel substrate, and an auxiliary cathode is formed on the top substrate panel, numerous benefits can be achieved which include the use of larger spacers such that the top panel substrate can be placed further apart from the bottom panel substrate to allow easier evacuation of air to achieve high vacuum. The use of thick spacers is possible since the spacers no longer control the distance between the primary cathode and the anode as in a conventional diode structured FED. More importantly, the assembly process for the novel FED panel can be simplified since the alignment of the top substrate and the bottom substrate is no longer critical due to the fact that phosphor is not coated on the top substrate and that critical alignment with the bottom nanotube emitters is no longer required. The present invention novel FED panel further provides the benefit that it can be viewed from either the top side of the panel and from the bottom side of the panel. When viewing from the top side is preferred, an additional reflective coating should be placed under the anode or the ITO film layer. A suitable reflective coating may be formed by Cr or Al.

The multiplicity of fluorescent coating strips on the anode, or the ITO layer, emits red, green or blue light upon activation by the electrons emitted from the plurality of emitter stacks. Each of the fluorescent coating strips is activated by a pair of adjacent nanotube emitters and emits a light that is different in color that emitted by its immediate adjacent coating strips. Finally, a plurality of side panels, i.e. four side panels may be used to join the peripheries of the bottom and the top substrates together utilizing a material such as glass fit to form a vacuum-tight cavity.

Figure 2:
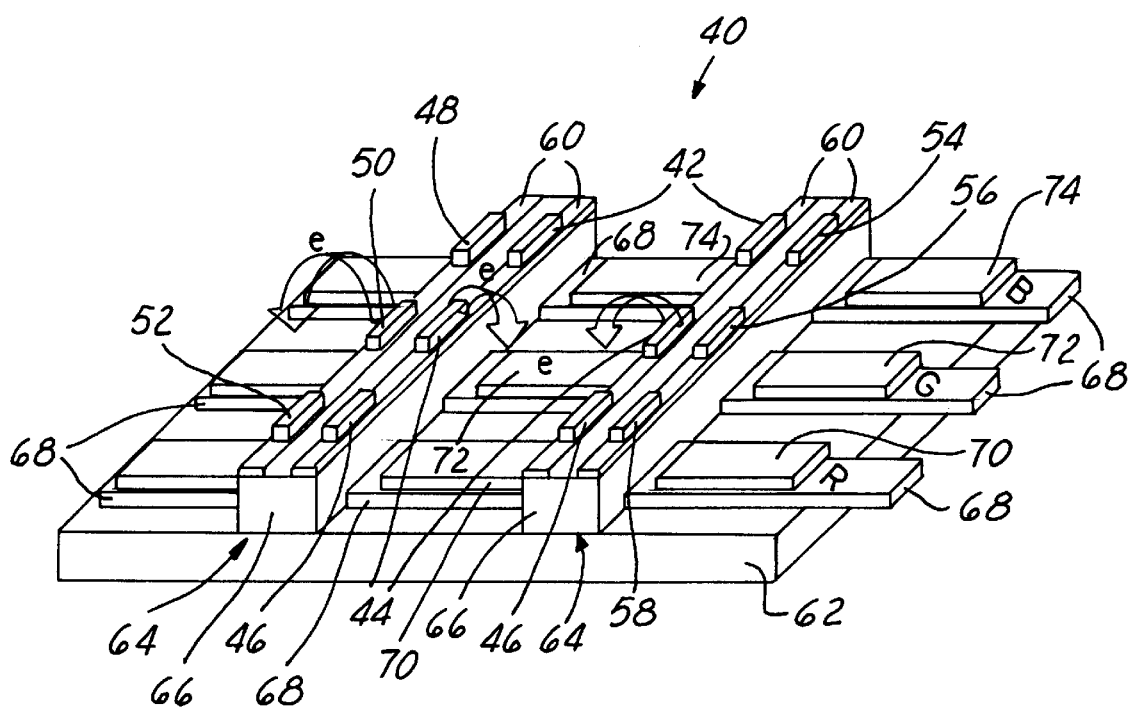
FIG. 2 is an enlarged, perspective view of the present invention field emission display panel having two cathodes and an anode without showing an upper panel substrate.

In the present invention novel structure 40, as shown in FIG. 2, since both the primary cathode and the anode are formed on the bottom glass substrate, electrons emitted from the nanotube emitters bombard on the phosphor coating strips, further assisted by the repelling force of the negative electronic field generated by the auxiliary cathode on the top glass substrate, in a manner that is similar to a reflective method by repelling force of the auxiliary cathode and the attraction of the anode for the electrons to make a 180° turn, as shown in FIG. 2. It should be noted that in a fabrication process, the nanotube emitters 42~58 cannot be deposited in a perfect rectangular shape as that shown in FIG. 2, i.e. they may be deposited more in the shape of a hump on top of the silver paste layer 60. It is thus possible that electrons will be emitted from the side of the hump instead of only from the top surface of a perfect rectangular shaped emitters 42~58.

Referring now to FIG. 2, wherein an enlarged, perspective view of the bottom panel 62 of the present invention novel FED panel 40 is shown. The panel 40 is formed on the bottom glass substrate 62 by a plurality of emitter stacks 64. Each of the plurality of emitter stacks 54 is formed by first depositing, by a thick film printing technique, a layer of a dielectric material 66 to a thickness of between about 10 $\mu$m and about 300 $\mu$m. The word "about" used in the context of this writing represents a range of value that is within ±10% of the average value given. The dielectric material may be suitably a silicon oxide, silicon nitride, silicon oxynitride, or any other suitable dielectric material. After the multiplicity of stacks of dielectric material is formed, an electrically conductive silver paste layer 60, or any other suitable conductive paste material, is printed on top of the dielectric layer 66. The thickness of the silver paste layer 60 screen printed may be of any suitable thicknesses, i.e. in the range between 5~10 $\mu$m. To complete the fabrication process for the emitter stacks 64 nanotube emitters 42~58 are deposited on top by a thick film printing technique to a thickness between about 5 $\mu$m and about 50 $\mu$m. The emitters 42~58 are printed in segments and in two parallelly situated, spaced-apart rows on separate silver paste layers 60.

The silver paste, or any other suitable conductive paste material for printing the paste layer 60, can be formed by mixing metallic particles, i.e. such as silver in a polymeric-based binder. The silver paste layer 60 formed is utilized as the cathode and is connected (not shown) to a negative electrical charge. In-between the plurality of emitter stacks 64, is formed strips of a conductive material layer 68 that is substantially, optically clear (such as ITO) for use as an anode for carrying a positive charge and thus effecting, in conjunction with the silver paste layer 60, an electric field (not shown) in-between the cathode 60 and the anode 68.

On top of the plurality of electrically conductive strips 68, which may be formed of ITO, is then deposited by a thick film printing technique a multiplicity of fluorescent coating strips 70~74. The multiplicity of fluorescent coating strips 70~74 can be formed of a fluorescent powder such as phosphor for emitting different colored lights of red (70), green (72) or blue (74) in an alternating manner when activated by a pair of adjacent nonotube emitters such that each strip emits a colored light different than its immediate adjacent strips. For instance, the pair of emitters 42 activates coating strip 74 to emit blue; the pair of emitters 44 activates coating strip 72 to emit green; while the pair of emitters 46 activates coating strip 70 to emit red. The multiplicity of fluorescent powder coating strips 70~74 and the multiplicity of electrically conductive strips 68 are insulated by the multiplicity of dielectric stack 66 such that the anode layers or the coating strips 70~74 are well insulated from each other. The multiplicity of fluorescent coating strips 70~74 in short lengths (also shown in FIG. 3) can be arranged such that each group of three strips, such as strips 70, 72 and 74 are capable of emitting red, green and blue lights, respectively, to function as a single pixel element. These plurality of fluorescent coating strips 70, 72 and 74 are more clearly shown in the plane view for the single pixel 80 in FIG. 3. This enables each pixel element 80 to be separately controlled for producing a colored image on the FED panel by suitably controlling electron emissions from the nanotube emitters to form multi-colored images. Different grades of the phosphor coating material can form red, green or blue light.

It should be noted that, in the present invention FED panel 40 wherein the primary cathode 60 and the anode 68 are both mounted on the bottom glass substrate 62, the operating voltage for the cathode 60 and the anode 68 can be suitably controlled based on the thickness of the dielectric material layer 66. Generally, an operating field strength is between about 4 volts/$\mu$m and about 6 volts/$\mu$m. For instance, for an average operating field strength of 5 volts/$\mu$m in a FED device that has a dielectric layer thickness between 10 $\mu$m and 100 $\mu$m, the operating voltage should be between about 50 volts and about 500 volts. It was found that in the present invention FED 40, a suitable thickness range for the dielectric layer 66 may be between about 10 $\mu$m and about 300 $\mu$m, and preferably between about 10 $\mu$m and about 100 $\mu$m.

The nanotube emitters 42~58 are deposited on top of the cathode layer 60 by a thick film printing technique forming the emitter stacks 64 with the silver paste layer, or the cathode layer 60. The nanotube emitters 42~58 emit electrons when charged by the cathode layer 60 with a negative electric charge. The nanotube emitters 42~58 are suitably formed by a thick film printing technique of a material such as carbon nanotubes, diamond nanotubes or diamond-like carbon nanotubes. The nanotube emitter material is first fractured and mixed with a solvent-containing paste resulting in a consistency that is suitable for use in thick film printing techniques such as screen printing or ink-jet printing. The nanotubes are frequently hollow and have a diameter between about 30 nanometers and about 50 nanometers. A lower operating electric field such as that between about 1 V/µm and about 5 V/µm is frequently required to activate the nanotube emitter materials for emitting electrons. The operating voltage required for the present invention novel diode structure FED panel is therefore significantly lower than that required for operating microtips in a conventional FED device.

The nanotube emitters 42~58 are first screen printed on the silver paste layer 60 and then hard baked to drive out residual solvent contained in the paste and to cure the layer. The nanotube emitters 42~58 normally contain between about 20 wt % and about 80 wt % of nanotubes with the remainder being a solvent-containing binder. Preferably, the nanotube paste contains about 50 wt % nanotubes and about 50 wt % binder. After a hard baking step, tips or sharp points of the nanotubes protrude above the surface of the nanotube layer for functioning as electron emission sources for the present invention novel FED panel.

Figure 4:
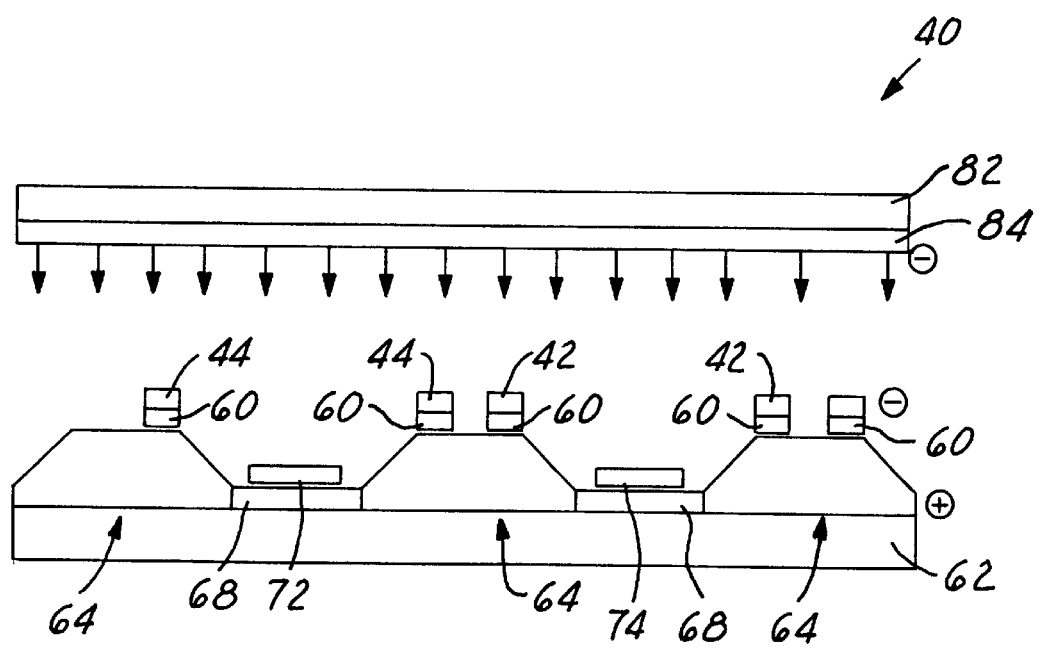
FIG. 4 is an enlarged, cross-sectional view of a pixel present invention field emission display panel of FIG. 2.

As shown in FIG. 4 of an enlarged, cross-sectional view of present invention FED device 40, three nanotubes emitter stacks 64 are formed on the bottom glass plate 62 in a transverse direction, spaced-apart with a gap formed in-between of about 140 µm. The carbon nanotube material can be formed of hollow tubes which are either single-walled or multi-walled nanotubes. The nanotubes, after being fractured, may have a length between about 1 µm and about 3 µm. The nanotubes may have an outside diameter between about 5 nm and about 50 nm which relates to an aspect ratio of about 100, when the length is 1 µm and the diameter is 10 nm. As shown in FIG. 4, the width of the nanotube emitter stacks 64 is about 120 µm.

Also shown in FIG. 4, is a top glass pate 82 (or a top panel substrate) with an electrically conductive layer 84 (of ITO) coated thereon. The ITO layer 84, when charged with a negative charge, acts as the auxiliary cathode which forms an electric field between the top plate 82 and the bottom plate 62 to further repel the electrons and direct them toward the anode 68.

When the FED device is viewed from the top, a light reflective coating is necessary for placement on the bottom of the ITO layer. A suitable light reflective coating can be formed by Al or Cr. When the FED device is to be viewed from the bottom, there is no need for the reflective coating layer. An improved contrast may be realized when viewed from the bottom of the device since there is no scattered light when compared to being viewed from the top.

During the fabrication of the present invention FED device, numerous post-curing steps are required after the deposition of the various material layers. For instance, the nanotube emitter layer, after being screen printed, should be cured at a temperature of about 450° C. for a time period of about 30~40 min. The dielectric material layer and the silver paste layer are normally cured at a temperature between about 550° C. and about 570° C. for a time period between about 30 min. and about 40 min. The fluorescent powder coating layer of the phosphor material is normally post-cured at 470° C. for a similar time period. The top glass plate and the bottom glass plate can be provided by commercial materials having a thickness of 0.7 mm or 1.1 mm. A distance between the top glass plate and the bottom glass plate is normally kept at between about 1 mm and about 3 mm.

Figure 3:
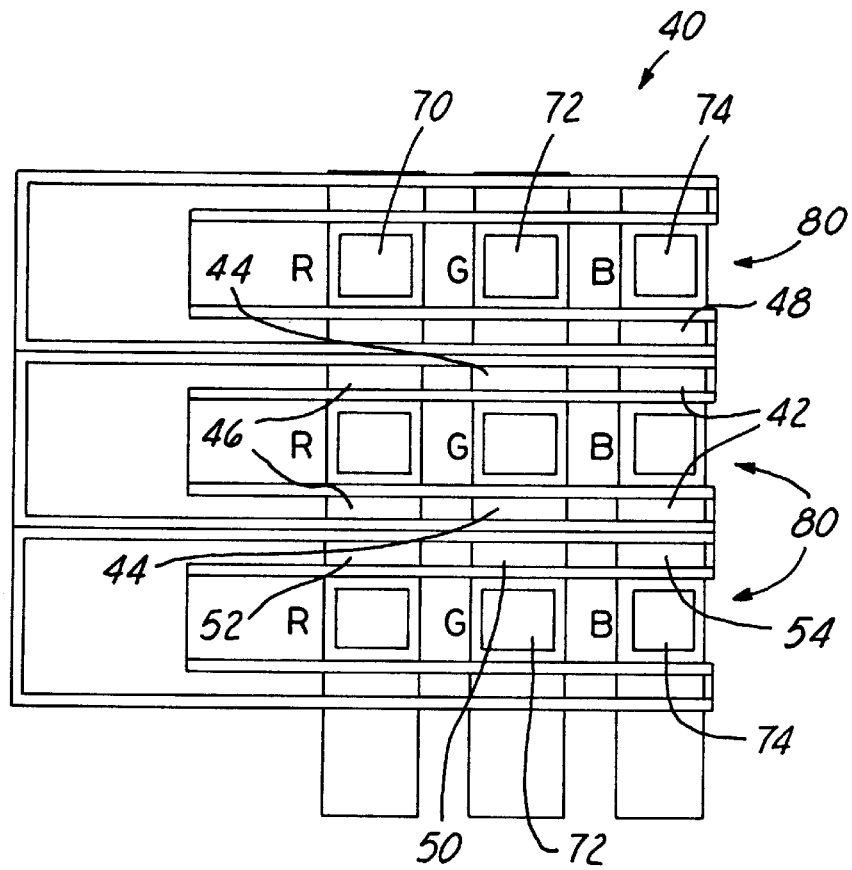
FIG. 3 is an enlarged, plane view of a pixel of the present invention field emission display panel of FIG. 2.

The present invention novel FED panel and a method for fabricating the panel have therefore been amply described in the above description and in the appended drawings of FIGS. 2–4.

While the present invention has been described in an illustrative manner, it should be understood that the terminology used is intended to be in a nature of words of description rather than of limitation.

Furthermore, while the present invention has been described in terms of a preferred and alternate embodiment, it is to be appreciated that those skilled in the art will readily apply these teachings to other possible variations of the inventions.

The embodiment of the invention in which an exclusive property or privilege is claimed are defined as follows:

What is claimed is:

1. A field emission display panel equipped with two cathodes and an anode comprising:

a first plate formed of an electrically insulating material, a first plurality of emitter stacks formed substantially equally spaced from each other at a predetermined spacing in a longitudinal direction on said first electrically insulating plate, each of said emitter stacks being positioned parallel to a transverse direction of said first insulating plate and comprises sequentially a layer of a dielectric material, a layer of a first electrically conductive material and a layer of nanotube emitters with said layer of dielectric material intimately contacting said first electrically insulating plate, said layer of nanotube emitters being formed in two rows spaced-apart and insulated from each other, a second plurality of nanotube emitters being formed spaced-apart and insulated from each other in each row, a second plurality of electrically conductive strips being formed of a substantially transparent material and situated in-between said plurality of emitter stacks insulated from each other by said layer of dielectric material, a second plurality of fluorescent coating strips formed on said second plurality of electrically conductive strips each for emitting a red, green or blue light upon activation by electrons emitted from said second plurality of nanotube emitters on said first plurality of emitter stacks, a second plate formed of an electrically insulating material positioned over and spaced-apart from said first plate, said second plate having on a surface facing said first plate a layer of said substantially transparent conductive material coated, and a plurality of side panels joining peripheries of said first and second plates together forming a vacuum-tight cavity therein.

2. A field emission display panel equipped with two cathodes and an anode according to claim 1, wherein said second plurality of electrically conductive strips further comprises a reflective coating layer in-between said second plurality of electrically conductive strips and said first plate.

3. A field emission display panel equipped with two cathodes and an anode according to claim 2, wherein said reflective coating layer being formed of a metal.

4. A field emission display panel equipped with two cathodes and an anode according to claim 1, wherein said first and second electrically insulating plates are formed of a ceramic material that is substantially transparent.

5. A field emission display panel equipped with two cathodes and an anode according to claim 1, wherein said layer of a first electrically conductive material is a first cathode and said substantially transparent material coated on aid second plate is a second cathode for said field emission display panel.

6. A field emission display panel equipped with two cathodes and an anode according to claim 1, wherein said layer of a first electrically conductive material is a silver paste.

7. A field emission display panel equipped with two cathodes and an anode according to claim 1, wherein said second plurality of electrically conductive strips is an anode for said field emission display panel.

8. A field emission display panel equipped with two cathodes and an anode according to claim 1, wherein said second plurality of electrically conductive strips is formed of indium-tin-oxide (ITO).

9. A field emission display panel equipped with two cathodes and an anode according to claim 1, wherein said layer of nanotube emitters being formed of a mixture of nanometer dimensioned hollow tubes and a binder material.

10. A field emission display panel equipped with two cathodes and an anode according to claim 1, wherein said layer of nanotube emitter being formed of a mixture of nanometer dimensioned hollow tubes of carbon, diamond or diamond-like carbon and a polymeric-based binder.

11. A field emission display panel equipped with two cathodes and an anode according to claim 1, wherein each of said second plurality of fluorescent coating strips emits a light of red, green or blue that is different than the light emitted by its immediate adjacent strips when activated by electrons emitted from an adjacent pair of said second plurality of nanometer emitters.

12. A field emission display panel equipped with two cathodes and an anode according to claim 1, wherein said layer of dielectric material in said first plurality of emitter stacks being formed to a thickness between about 10 $\mu$m and about 300 $\mu$m.

13. A method for fabricating a field emission display panel with two cathodes and an anode comprising the steps of:
  providing a first plate formed of an electrically insulating material,
  forming a first plurality of electrically conductive strips of a substantially transparent material on said first electrically insulating plate, said first plurality of electrically conductive strips being an anode,
  forming a first plurality of emitter stacks on said first electrically insulating plate by a thick film printing technique parallel to a transverse direction of said first electrically insulating plate, each of said emitter stacks comprises sequentially a layer of a dielectric material, a layer of a second electrically conductive material and a layer of nanotube emitters with said layer of dielectric material intimately contacting said fist electrically insulating plate,
  forming a second plurality of nanotube emitters spaced-apart and insulated from each other in two parallelly situated and spaced-apart rows on top of each said emitter stack from said layer of nanotube emitters, said second plurality of nanotube emitters being a first cathode,
  forming a second plurality of fluorescent coating strips on said first plurality of electrically conductive strips each for emitting a red, green or blue light when activated by electrons emitted from said second plurality of nanotube emitters on said first plurality of emitter stacks,
  positioning a second plate formed of an electrically insulating material over and spaced-apart from said first plate, said second plate having on a surface facing said first plate a layer of said substantially transparent material coated-forming a second cathode, and
  joining said first and second plates together by side panels and forming a vacuum-tight cavity therein.

14. A method for fabricating a field emission display panel with two cathodes and an anode according to claim 13 further comprising the step of providing said first and second plates in substantially transparent glass plates.

15. A method for fabricating a field emission display panel with two cathodes and an anode according to claim 13 further comprising the step of printing said layer of a second electrically conductive material in a silver paste.

16. A method for fabricating a field emission display panel with two cathodes and an anode according to claim 13 further comprising the step of printing said layer of nanotube emitters with a mixture of a binder and nanometer dimensioned hollow fibers selected from the group consisting of carbon fibers, diamond fibers and diamond-like carbon fibers.

17. A method for fabricating a field emission display panel with two cathodes and an anode according to claim 13 further comprising the step of connecting a negative charge to each of said first and second cathode and a positive charge to said anode.

18. A method for fabricating a field emission display panel with two cathodes and an anode according to claim 13, wherein said first plurality of electrically conductive strips is formed of indium-tin-oxide (ITO).

19. A method for fabricating a field emission display panel with two cathodes and an anode according to claim 13 further comprising the step of coating a reflective coating layer in-between said first plurality of electrically conductive strips and said first plate.

20. A method for fabricating a field emission display panel with two cathodes and an anode according to claim 13, wherein said second multiplicity of fluorescent coating strips is formed by a thick film printing technique.

21. A method for fabricating a field emission display panel with two cathodes and an anode according to claim 13, wherein said second multiplicity of fluorescent coating strips is formed such that each strip emits a red, green or blue light that is different than its immediate adjacent strips when activated by electrons emitted from an adjacent pair of said second plurality of nanotube emitters.

22. A method for fabricating a field emission display panel with two cathodes and an anode according to claim 19 further comprising the step of coating said reflective coating layer in a metallic material.

23. A method for fabricating a field emission display panel with two cathodes and an anode according to claim 13 further comprising the step of coating said reflective coating layer in Cr or Al.

24. A method for fabricating a field emission display panel with two cathodes and an anode according to claim 13 further comprising the step of forming said second plurality of fluorescent coating strips by a material that comprises phosphor.

* * * * *